United States Patent [19]

Schmitt

[11] Patent Number: 4,539,899
[45] Date of Patent: Sep. 10, 1985

[54] VESSEL FOR COOKING FOOD WITH COOLING LID

[75] Inventor: Paul Schmitt, Fresnoy Le Grand, France

[73] Assignee: Haut Fourneau et Fonderies de Cousances aux Forgers, S.A., Ancerville, France

[21] Appl. No.: 304,981

[22] Filed: Sep. 23, 1981

[30] Foreign Application Priority Data

Sep. 24, 1980 [FR] France .............................. 80 20458

[51] Int. Cl.³ ............................................. A47J 37/10
[52] U.S. Cl. ....................................... 99/347; 126/381
[58] Field of Search .................. 99/345, 347; 126/381, 126/382, 390

[56] References Cited

U.S. PATENT DOCUMENTS

| 13,595 | 9/1855 | Hall | 126/382 |
|---|---|---|---|
| 738,698 | 9/1903 | Renoy | 126/382 X |
| 738,986 | 9/1903 | Covert | 126/381 X |
| 1,214,409 | 1/1917 | Barth et al. | 99/347 |
| 1,554,612 | 9/1925 | Wilson et al. | 99/347 X |
| 1,625,847 | 4/1927 | Decker | 126/390 |
| 1,789,349 | 1/1931 | Ballman | 99/347 |
| 1,968,950 | 8/1934 | Maigret | 99/347 |
| 2,321,749 | 6/1943 | Howlett | 126/381 |
| 3,085,498 | 4/1963 | Falla | 99/347 |
| 3,232,214 | 2/1966 | Aske | 99/347 |

FOREIGN PATENT DOCUMENTS 89613 of 0000 Fed. Rep. of Germany ...... 126/382

Primary Examiner—Billy J. Wilhite
Attorney, Agent, or Firm—Kuhn Muller and Bazerman

[57] ABSTRACT

A vessel according to the invention is intended for cooking food and comprises a body 1 and a lid 2 provided with a cavity 4 to receive water (A). The cavity is disposed in annular form around an elevated portion 5. The internal surface 6 of the lid 2 is substantially arch-shaped, which shape tends to engage the internal walls 7 of the body 1. Thus, the vapor condenses in the center and the droplets flow on the surface 6 so as to fall only on the periphery or flow along the walls 7 so that they do not fall directly on the food B.

6 Claims, 2 Drawing Figures

VESSEL FOR COOKING FOOD WITH COOLING LID

Already known are vessels for cooking food such as cast-iron stewpots whose removable lid is provided with a cavity into which water can be poured so that it cools with the aim to cause inside the condensation of cooking vapors and the return of these vapors to the food.

French Pat. No. 720.246 and its Patent of Addition No. 42.114 are, for example, known.

These specifications describe a stewpot having a lid with a cavity for water on the surface intended to be placed at the outside and which is provided with small protuberances on the surface intended to be placed at the inside, with these two coupled means being disposed in the center of the lid so that the water of condensation coming from the food can flow toward the center of the pot.

As explained in these prior specifications, these means are purposely formed so as to prevent the condensed vapors from flowing back into another zone than the central portion which is the hottest.

This is also the case in French Pat. No. 937.348 describing a device which is the exact opposite of that of the present invention as explained in said patent on page 1, col. 1, lines 4 to 17.

As a matter of fact, according to this patent the flow of the condensed vapors toward the periphery of the lid and the edges of the pot must be opposed so as to cause, on the contrary, the direct fall of the condensates onto the food being cooked.

To this end, this patent claims on the internal surface of the lid, concentrical embossments which constitute so many obstacles against the radial flow of the vapors.

Experience has shown that these devices are generally satisfactory and constitute a very practical improvement over known pots.

However, it has been observed that, apart from the advantages gained, these devices have definite shortcomings because of the fact that the condensed vapors cause the falling of the condensed droplets down from above the central zone.

One might think that the explanations given are logical, but this is only true when the pot is empty. If it contains food, such as a piece of meat, it can be seen that the condensed droplets fall onto the meat and not onto the bottom.

French Pat. No. 620.808 describes an intermediary lid which contains water and which has a convex bottom.

However, as mentioned in particular on page 2, col. 1, lines 26 to 48, this system functions in a manner different from that of the present invention, as it is based on the idea of causing the removal of cooking vapors and their collecting inside a closed space, i.e. the continuous extraction of the vapors.

French Pat. No. 936.679 also describes a lid containing water and having a convex bottom (page 1, col. 2, lines 1 and 2), but one can notice that the lid has a closed space, the use of which is similar to that used in a kettle so that water introduced therein extends over the whole surface without leaving an emerged portion at the center.

U.S. Pat. No. 1,625,847 may be mentioned because of the features of the claimed object, such as that shown in FIG. 2.

When the text itself is read, it is noted (page 2, col. 1, line 40 to col. 2, line 36) that the shape of the lid, of its edge and of the rim of the pot are designed so as to provide a tight device and that the lid has no facilities for pouring water therein.

Furthermore, the lid shown in FIG. 2 of this patent is so prominent that one can no longer speak of a central-portion and even less of one covered by water, but rather of a simple annular space, with the circular wall closest to the center being insufficiently curved to obtain the effect of the present invention.

British Pat. No. 1,304,913 is also mentioned only because of the shape of the pot shown in FIGS. 2 and 3.

This patent relates in fact to a porous ceramic which has nothing in common with the present invention. On the other hand, FIGS. 2 and 3 show embossments 3, but they are disposed in parallel segments which is inconsistent with the object of the present invention which includes freedom of radial flow, i.e. over 360° of the lid.

The present invention obviates these shortcomings and allows the condensed water to return toward the bottom of the vessel, not through the center, but in a peripheral zone.

The invention is set forth in the following detailed description in which reference is made to the attached drawings.

It is to be noted that description and drawing are given only as examples but the invention is not limited thereto.

Figure 2:
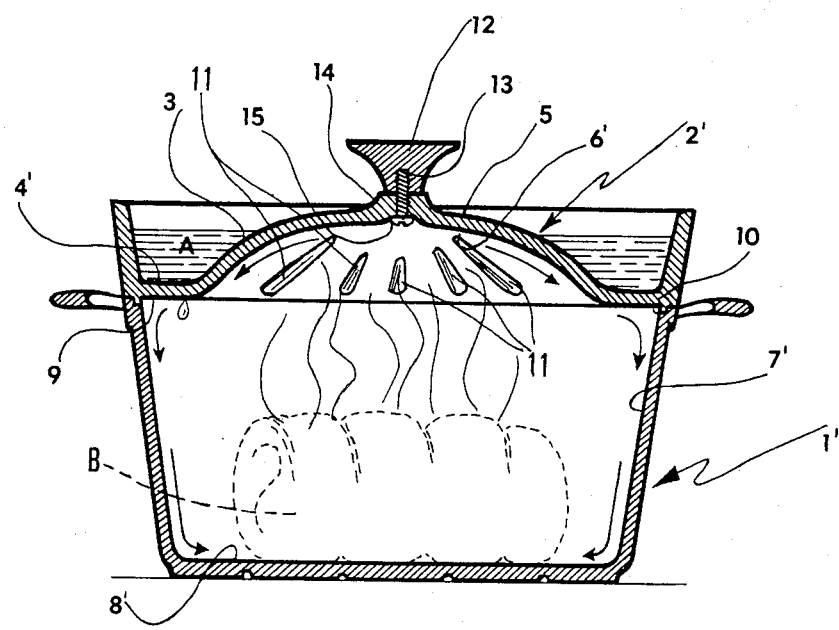
FIG. 2 is a section of a stewpot according to a second embodiment of the invention.

According to the invention, a vessel for cooking food is of the type comprising a hollow body 1 on which a removable lid 2 can be placed, the surface 3 of which is situated at the outside and is provided with a cavity 4 for receiving water A and is characterized in that the cavity 4 is annular and disposed around a convex and elevated central portion 5 of the lid whose top is substantially level with the rim of the cavity 4, so that the water depth increases from the center to the periphery thereof, and the surface 6 of the lid 2 is positioned inside in a substantially arch-shaped form which tends to engage the internal walls 7 of the body 1.

It can be seen that with these means a food B to be cooked, such as a piece of meat, is placed in the center of the body 1 and the vapors which are formed during cooking meet up with the surface 6 of the lid 2 which, in its center, is smooth in such a way that the arch-like shape of this surface and the absence of any protuberances thereon cause the vapors to migrate toward the periphery of the lid 2 straight below the annular space 4 filled with water A, with this periphery therefore being a zone which is relatively cold, whereat the vapors terminate and condense to form droplets.

The arch-like shape of the surface 6 tends to join in the best possible way with the walls 7 of the body 1, so that the droplets can slide along these walls where they get reheated before they reach the bottom 8.

The cycle extends therefore in the upward direction in the center of the pot and in the downward direction at its periphery.

The condensed droplets are not only reheated before they reach the bottom 8, but are also prevented from falling down in the center of the pot; this is the contrary of what has been done up to now.

According to a feature of the invention, the surface 6 of the lid 2 is uniformly and continuously inclined from the top in the central zone to the base at the periphery.

In this way there is nothing to interfere with the radial flow of the vapors and condensates up to the lowest edge of the lid 2.

However, this solution may pose delicate manufacturing problems when, for example, the vessel 1 and the lid 2 are made of cast-iron in a sand mold.

As a matter of fact, the angle α, formed by the tangent of the curvature of the arch and the edge 2a of the lid 2 is acute and allows only little material to remain; and this creates a fragile boundary.

Referring now to FIG. 2, it can be seen that according to a feature of the invention, the surface 6' of the lid 2', before being positioned inside, comprises a peripheral flat zone 9.

This zone 9 is disposed straight below the cavity 4' in the deepest portion which contains most of the water A and where there still remains some of it when the rest has evaporated. It is therefore the coolest area where condensation is at a maximum.

The vapors therefore undergo a non-uniform but progressive condensation from the center to the periphery. The droplets resulting from complete condensation of the vapors fall from the zone 9 around a piece of meat B, for example.

However, the surface 6, engages the wall 7" by means of an edge 10' for favoring the flow of the droplets along the wall 7' where they are heated again before reaching the bottom 8'.

According to a feature of the invention, the surface 6' of the lid 2' is provided with embossments 11, having a shape and being disposed so as to favor the radial flow of the condensed vapors from the central zone toward the entire peripheral zone and to enhance cooling of these vapors.

Since at least the larger portion of the condensed vapors must be conveyed to the walls 7' of the body 1', the embossments 11 should not transversely obstruct the radial flow and must be disposed away from the center so that their protuberances do not cause the droplets to fall into the central portion of the vessel.

In a preferred embodiment of the invention the embossments 11 therefore extend radially from the center (FIG. 2).

It is also for this reason that the embossments 11 are provided in the peripheral zone, but not as far as their substantially common center.

The elevated central portion 5' is convex and has the same shape as the surface 6'. This external dome shape corresponds to the internal arch shape. As the level of the water A is always horizontal, the depth thereof increases from the center to the periphery, and this in turn increases the progressive condensation effect described above.

A knob 12, preferably insulating, is attached by a screw 13 to the center of the lid 2', on the top of an external embossment 14 which corresponds to an internal cavity 15 in which the screw is disposed. Far from reducing the effect of the invention, this arrangement creates a small central zone which is very hot since it cannot be covered by the water A. The vapors which reach the cavity 15 are not condensed and leave it radially as described above.

To create more stability for handling, lateral handles may be provided instead of a central knob 12.

Figure 1:
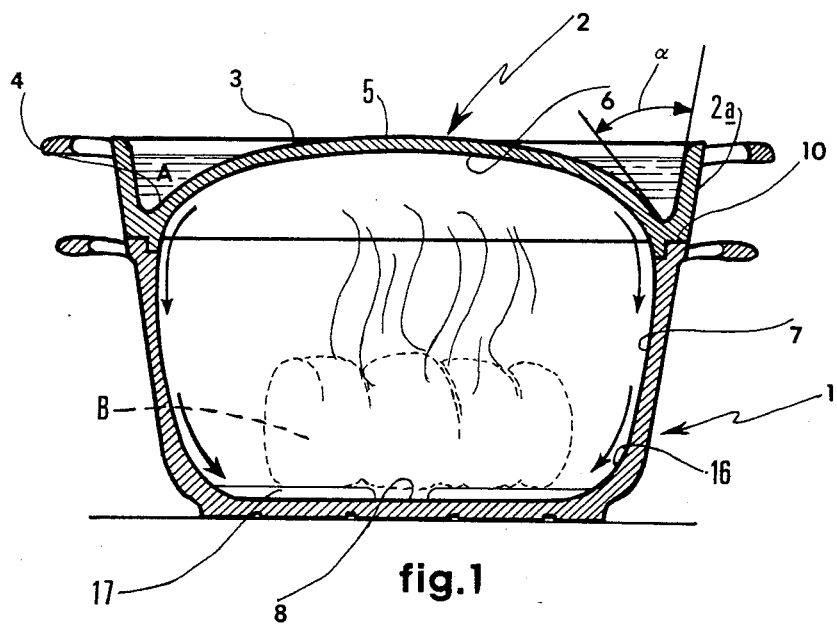
FIG. 1 is a sectional view of a cast iron stewpot having a removable lid in a first embodiment of the invention.

FIG. 1 shows a modification of the invention in which the walls 7 and the bottom 8 of the body 1 are joined by a groove 16 which extends along a large curve in order to aid the condensed vapors in flowing toward the center of the bottom 8.

According to a modification of this embodiment, the inside of the body 1 and the internal surface of the lid 2 form together an almost continuous, spheroidal volume.

Therefore, without break in continuity, a surface is obtained which favors the peripheral motion of the condensed vapors from the top of the lid to the base of the bottom 8.

To aid the droplets in passing under the food (such as a piece of meat B), the central zone of the bottom 8 of the body 1 has a cavity, whereas the radial embossments are, in fact, in the same plane as the bottom 8.

In this arrangement the food to be cooked, such as the piece of meat B, rests on the embossments 17 and the condensed vapors which flow along the walls 7 reach the central portion of the bottom 8 while flowing between the embossments and mixing with the sauce of the meat, but without falling straight onto the meat B.

when the body 1 is entirely spheroidal, like that shown in FIG. 1, the external walls thereof may have a slightly different shape when various thicknesses of the walls are desired.

The invention is not limited to the embodiments described and shown but include, on the contrary, all modifications.

I claim:

1. A vessel for cooking food, of the type comprising a hollow body having sidewalls extending upwardly from a bottom wall, said sidewalls having an internal surface and a removable lid with internal and external surfaces which may be placed on the sidewalls of said hollow body, said removable lid having a convex and elevated central portion and having on its external surface a cavity for receiving water between a rim about the periphery thereof which cavity is annular and disposed around said convex and elevated central portion of said lid, the top of which is substantially level with the peripheral rim of the cavity so that the depth of the water increases from the center of the lid to the periphery thereof, and wherein at least the central portion of the internal surface of the lid is substantially dome-shaped and the periphery of the internal surface of said lid terminates at and merges with the sidewalls of said hollow body at a point where the internal surface of said sidewalls terminate and which is substantially at the top of said sidewalls.

2. Vessel according to claim 1, wherein the external surface of the lid is inclined uniformly and continuously from its top, positioned in the central zone, to its base, positioned at the periphery.

3. Vessel according to claim 1, wherein the internal surface of the lid comprises a flat zone inside the periphery.

4. A vessel according to claim 1, wherein the internal surface of the lid is provided with embossments having a form and being disposed so as to favor the radial flow of condensed vapors from the central portion toward said periphery of said internal surface of said lid to enhance cooling of said vapors.

5. A vessel according to claim 4, wherein the embossments extend radially.

6. A vessel according to claim 5 wherein the embossments extend about the periphery of said lid, but not to their common center.

* * * * *